United States Patent
Tsuda et al.

(10) Patent No.: US 7,096,861 B1
(45) Date of Patent: Aug. 29, 2006

(54) CONTROL SYSTEM FOR INTERNAL COMBUSTION ENGINE

(75) Inventors: Masaki Tsuda, Wako (JP); Kentaro Onuma, Wako (JP); Takeshi Hara, Wako (JP); Hidetaka Maki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/374,194

(22) Filed: Mar. 14, 2006

(30) Foreign Application Priority Data

Mar. 15, 2005 (JP) .............................. 2005-072163

(51) Int. Cl.
*F02D 41/22* (2006.01)
*G01M 15/10* (2006.01)

(52) U.S. Cl. ................ 123/688; 123/568.16; 73/118.1; 701/107

(58) Field of Classification Search ................ 123/679, 123/688, 568.16; 73/117.2, 117.3, 118.1; 701/103, 107, 108
See application file for complete search history.

(56) References Cited

U.S. PATENT DOCUMENTS

| | | | |
|---|---|---|---|
| 4,671,107 A | * | 6/1987 | Chiesa et al. ............... 73/118.2 |
| 4,715,348 A | * | 12/1987 | Kobayashi et al. ........... 73/116 |
| 5,621,167 A | * | 4/1997 | Fang-Cheng ................ 73/118.1 |
| 5,771,869 A | * | 6/1998 | Yoshihara et al. ..... 123/568.16 |
| 6,609,059 B1 | * | 8/2003 | Kawaguchi et al. ........ 701/104 |
| 2005/0210970 A1 | * | 9/2005 | Terada ....................... 73/117.3 |

FOREIGN PATENT DOCUMENTS

| | | | |
|---|---|---|---|
| EP | 0 812 983 | * | 12/1997 |
| JP | 4-101055 A | | 4/1992 |
| JP | 10-339216 | * | 12/1998 |

* cited by examiner

*Primary Examiner*—Hai Huynh
(74) *Attorney, Agent, or Firm*—Arent Fox, PLLC.

(57) ABSTRACT

A control system for an internal combustion engine is disclosed. The engine has an exhaust gas recirculation device which includes an exhaust gas recirculation passage for recirculating exhaust gases from the engine to an intake system of the engine, and an exhaust gas recirculation control valve provided in the exhaust gas recirculation passage, for controlling a flow rate of the exhaust gases. An air-fuel ratio control amount is calculated based on an output of the air-fuel ratio sensor provided in the exhaust system of the engine. The air-fuel ratio of the air-fuel mixture supplied to the engine is controlled with the air-fuel ratio control amount. A failure of the exhaust gas recirculation device is determined based on a changing component of the air-fuel ratio control amount when changing an opening of the exhaust gas recirculation control valve in a predetermined cycle.

15 Claims, 11 Drawing Sheets

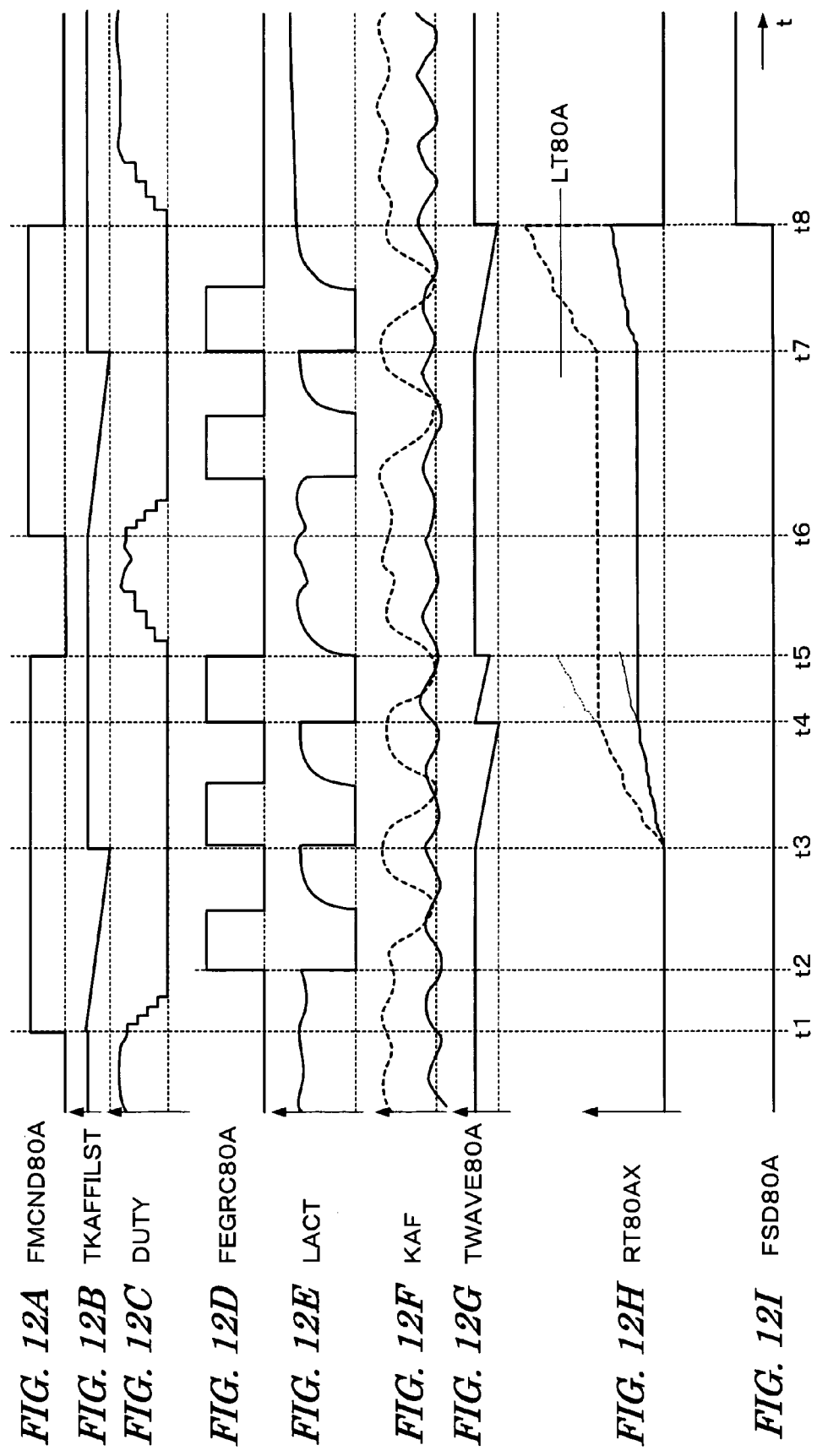

CONTROL SYSTEM FOR INTERNAL COMBUSTION ENGINE

BACKGROUND OF THE INVENTION

1. Field of the Invention

The present invention relates to a control system for an internal combustion engine provided with an exhaust gas recirculation device for recirculating exhaust gases to an intake system, and particularly to a control system which determines a failure of the exhaust gas recirculation device.

2. Description of the Related Art

A control system, which determines a failure of the exhaust gas recirculation device based on an output of an air-fuel ratio sensor provided in an exhaust system of the engine, is shown in Japanese Patent Laid-open No. 4-101055. In this system, an integrated value ION of the air-fuel ratio sensor output when executing the exhaust gas recirculation, and an integrated value IOFF of the air-fuel ratio sensor output when not executing the exhaust gas recirculation, are calculated. If the difference (IOFF-ION) between the integrated values is equal to or less than a determination value Δ I, it is determined that the exhaust gas recirculation device fails.

In the above-described conventional system, the integrated value obtained by simply integrating the air-fuel ratio sensor output is used for the determination. Therefore, the determination accuracy can be improved.

SUMMARY OF THE INVENTION

An object of the present invention is to provide a control system for an internal combustion engine, which can determine a failure of the exhaust gas recirculation device with sufficient accuracy by a comparatively simple method.

In order to attain the above object, the present invention provides a control system for an internal combustion engine (1) provided with an exhaust gas recirculation device which includes an exhaust gas recirculation passage (21) for recirculating exhaust gases from the engine to an intake system (2) of the engine, and an exhaust gas recirculation control valve (22) provided in the exhaust gas recirculation passage (21), for controlling a flow rate of the exhaust gases. The control system includes an air-fuel ratio sensor (14), air-fuel ratio control means, and failure determining means. The air-fuel ratio sensor (14) is provided in the exhaust system (12) of the engine. The air-fuel ratio control means carries out feedback control of an air-fuel ratio of an air-fuel mixture supplied to the engine based on an output of the air-fuel ratio sensor (14). The failure determining means determines a failure of the exhaust gas recirculation device based on a changing component (KAFFIL80A) of an air-fuel ratio control amount (KAF) calculated by the air-fuel ratio control means when changing the opening (LACT) of the exhaust gas recirculation control valve (22) in a predetermined cycle (TEGRC80A×2).

With this configuration, when changing the opening of the exhaust gas recirculation control valve in the predetermined cycle, the failure of the exhaust gas recirculation device is determined based on the changing component of the air-fuel ratio control amount calculated by the air-fuel ratio control means. For example, when a leak is present in the exhaust gas recirculation passage, the air-fuel ratio control amount changes in a cycle which is equal to the cycle of the opening change, if the opening of the exhaust gas recirculation control valve is changed in the predetermined cycle. Therefore, if the changing component is detected, it can be determined that a leak is present. Since the cycle (frequency) of the changing component is known (i.e., equal to the predetermined cycle), using a filter whose passing band is appropriately set according to the predetermined cycle makes it possible to perform accurate detection, to raise the determination accuracy by a comparatively simple method.

Preferably, the failure determining means determines that a leak is present in the exhaust gas recirculation device when an accumulated value (RT80AHLD, RT80A) of the changing component (KAFFIL80A) exceeds a determination threshold value (LT80A).

Preferably, the failure determining means includes filtering means for performing a band pass filtering of the air-fuel ratio control amount (KAF) to calculate a filtered air-fuel ratio control amount (KAFFIL80A), and the changing component is the filtered air-fuel ratio control amount (KAFFIL80A).

Preferably, the failure determining means includes execution condition determining means for determining an execution condition of the failure determination according to an operating condition of the engine, holds the accumulated value (RT80AHLD) when the execution condition is unsatisfied, and starts the accumulating calculation using the held accumulated value (RT80AHLD) as an initial value when the execution condition is satisfied.

Preferably, the control system further includes EGR correction means for correcting an amount of fuel supplied to the engine in a decreasing direction as an opening (LACT) of the exhaust gas recirculation control valve (22) increases.

BRIEF DESCRIPTION OF THE DRAWINGS

FIGS. 12A–12I are time charts for illustrating the failure determination process.

DETAILED DESCRIPTION OF THE PREFERRED EMBODIMENTS

Preferred embodiments of the present invention will now be described with reference to the drawings.

Figure 1:
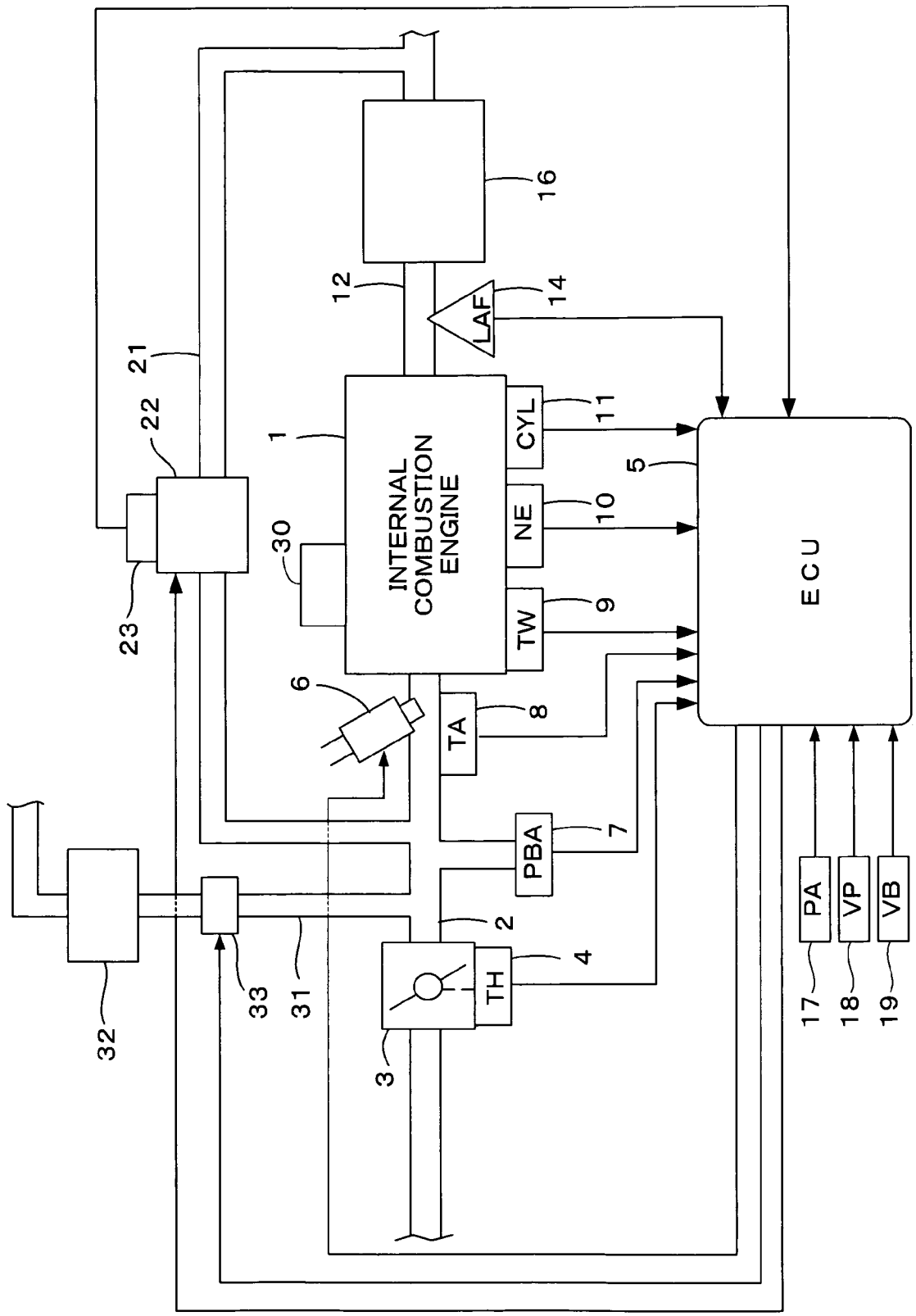
FIG. 1 is a schematic diagram showing a configuration of an internal combustion engine and a control system therefor according to an embodiment of the present invention.

FIG. 1 is a schematic diagram showing a configuration of an internal combustion engine and a corresponding control system according to a first embodiment of the present invention. The engine 1 is, for example, a four-cylinder engine having an intake pipe 2 provided with a throttle valve 3. A throttle opening sensor (TH) 4 is connected to the throttle valve 3, so as to output an electrical signal according to an opening of the throttle valve 3 and supply an electrical signal to an electronic control unit (hereinafter referred to as "ECU") 5.

Fuel injection valves 6 are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

An absolute intake pressure sensor (PBA) 7 is provided immediately downstream of the throttle valve 3. The absolute intake pressure sensor detects a pressure in the intake pipe, and an absolute pressure signal changed to the electrical signal by the absolute pressure sensor 7 is supplied to the ECU 5. An intake air temperature sensor (TA) 8 is provided downstream of the absolute pressure sensor 7 to detect an intake temperature TA. An electrical signal corresponding to the detected intake air temperature TA, is outputted from the sensor 8 and supplied to the ECU 5.

An engine coolant temperature sensor (TW) 9 such as a thermistor is mounted on the body of the engine 1 to detect an engine coolant temperature (cooling water temperature) TW. A temperature signal corresponding to the detected engine coolant temperature TW is outputted from the sensor 9 and supplied to the ECU 5.

An engine rotational speed sensor (NE) 10 and a cylinder discrimination sensor (CYL) 11 are mounted in facing relation to a camshaft or a crankshaft (both not shown) of the engine 1. The engine rotational speed sensor 10 outputs a TDC pulse at a crank angle position located at a predetermined crank angle before the top dead center (TDC) corresponding to the start of an intake stroke of each cylinder of the engine 1 (at every 180° crank angle in the case of a four-cylinder engine). The cylinder discrimination sensor 11 outputs a cylinder discrimination pulse at a predetermined crank angle position for a specific cylinder of engine 1. These pulses outputted from sensors 10 and 11 are supplied to the ECU 5.

An exhaust pipe 12 of the engine 1 is provided with an exhaust gas purifying catalyst 16 which removes NOx, HC, and CO contained in the exhaust gases, and a proportional type air-fuel ratio sensor 14 (hereinafter referred to as "LAF sensor 14") is mounted on the upstream side of the exhaust gas purifying catalyst 16. The LAF sensor 14 outputs an electrical signal substantially proportional to the oxygen concentration (air-fuel ratio) in the exhaust gases, and supplies the electrical signal to the ECU 5.

An exhaust gas recirculation passage 21 is connected between a portion of the intake pipe 2 downstream of the throttle valve 3 and a portion of the exhaust pipe 12 downstream of the exhaust gas purifying catalyst 16. The exhaust gas recirculation passage 21 is provided with an exhaust gas recirculation valve (hereinafter referred to as "EGR valve") 22 for controlling an exhaust gas recirculation amount. The EGR valve 22 is an electromagnetic valve having a solenoid, and its valve opening is controlled by the ECU 5. The EGR valve 22 is provided with a lift sensor 23 for detecting the valve opening (valve lift) LACT of the EGR valve 22 and for supplying a detection signal to the ECU 5. The exhaust gas recirculation passage 21 and the EGR valve 22 constitute an exhaust gas recirculation device.

A canister 32 is connected to a fuel tank (not shown) to store evaporative fuel generated in the fuel tank. The canister 32 contains an adsorbent for absorbing the evaporative fuel. The canister 32 is connected through a purging passage 31 to the intake pipe 2 at a portion downstream of the throttle valve 3. The purging passage 31 is provided with a purge control valve 33. The purge control valve 33 is a solenoid valve capable of continuously controlling a flow rate by changing an on-off duty ratio of a control signal received. The operation of the purge control valve 33 is controlled by the ECU 5. Alternatively, The purge control valve 38 may be a solenoid valve capable of continuously changing the opening thereof. The above-described on-off duty ratio is equivalent to the opening of such a solenoid valve, the opening of which can be continuously be changed. The purging passage 31, the canister 32, and the purge control valve 33 constitute an evaporative fuel processing system.

The engine 1 is provided with a valve timing switching mechanism 30 for switching the closing timing of the intake valve between a normal closing timing and a retarded closing timing. The operation of the valve timing switching mechanism 30 is controlled by the ECU 5 according to the engine operating condition.

An atmospheric pressure sensor 17 for detecting the atmospheric pressure PA, a vehicle speed sensor 18 for detecting a running speed VP of the vehicle driven by the engine 1, and a battery voltage sensor 19 for detecting an output voltage VB of a battery which supplies electric power to the electromagnetic valve described above and the ECU 5 are connected to the ECU 5. Detection signals of these sensors are supplied to the ECU 5.

The ECU 5 includes an input circuit, a central processing unit (hereinafter referred to as "CPU"), a memory circuit, and an output circuit. The input circuit performs numerous functions, including shaping the waveforms of input signals from the sensors described above, correcting the voltage levels of the input signals to a predetermined level, and converting analog signal values into digital signal values. The memory circuit preliminarily stores various operating programs to be executed by the CPU and stores the results of computations or the like by the CPU. The output circuit supplies control signals to the fuel injection valves 6, the EGR valve 22, the purge control valve 33 and the valve timing switching mechanism 30.

The ECU 5 determines various engine operating conditions according to the output signals from the sensors described above to supply a control signal to the solenoid of the EGR valve 22. Specifically, the ECU 5 sets a valve lift command value LCMD according to the engine rotational speed NE and an absolute intake pressure PBA, and controls the EGR valve 22 so that a deviation between the valve lift command value LCMD and an actual valve lift amount LACT detected by the lift sensor 23, becomes zero.

The CPU in the ECU 5 determines various engine operating conditions according to the output signals from the sensors described above, and computes a fuel injection period TOUT of each fuel injection valve 6 to be opened in synchronism with the TDC pulse. The fuel injection period TOUT is calculated by the following equation (1), according to the engine operating conditions.

$$TOUT = TIM \times KCMD \times KAF \times KEGR \times K1 + K2 \qquad (1)$$

The basic fuel injection period TIM is determined by retrieving a TI map that is set according to the engine rotational speed NE and the absolute intake pressure PBA. The TI map is set so that the air-fuel ratio of an air-fuel mixture to be supplied to the engine 1 becomes substantially equal to the stoichiometric ratio according to the engine rotational speed NE and the absolute intake pressure PBA on the map.

KCMD is a target air-fuel ratio coefficient, which is set according to engine operating parameters such as the engine rotational speed NE, the absolute intake pressure PBA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio. KCMD is also referred to as a target equivalent ratio.

KAF is an air-fuel ratio correction coefficient calculated so that a detected equivalent ratio KACT calculated from a detected value output from the LAF sensor 14 coincides with the target equivalent ratio KCMD. If the feedback control according to the output from LAF sensor 14 is not performed, the air-fuel ratio correction coefficient KAF is set to "1.0".

KEGR is an EGR correction coefficient which is set to 1.0 (noncorrection value) when the exhaust gas recirculation is not carried out (when the EGR valve 22 is closed) or set to a value less than 1.0 when the exhaust gas recirculation is carried out (when the EGR valve 22 is opened) to decrease a fuel injection amount according to a decrease in the intake air amount in response to the increase in the valve lift amount LACT of the EGR valve 22.

K1 and K2 are another correction coefficient and a correction variable calculated according the engine operating condition, respectively. The correction coefficient K1 and correction variable K2 may be determined to optimize various characteristics such as fuel consumption characteristics and engine acceleration characteristics according to engine operating conditions.

The CPU in the ECU 5 supplies a drive signal for opening each fuel injection valve 6 according to the fuel injection period TOUT obtained above.

Figure 2A:
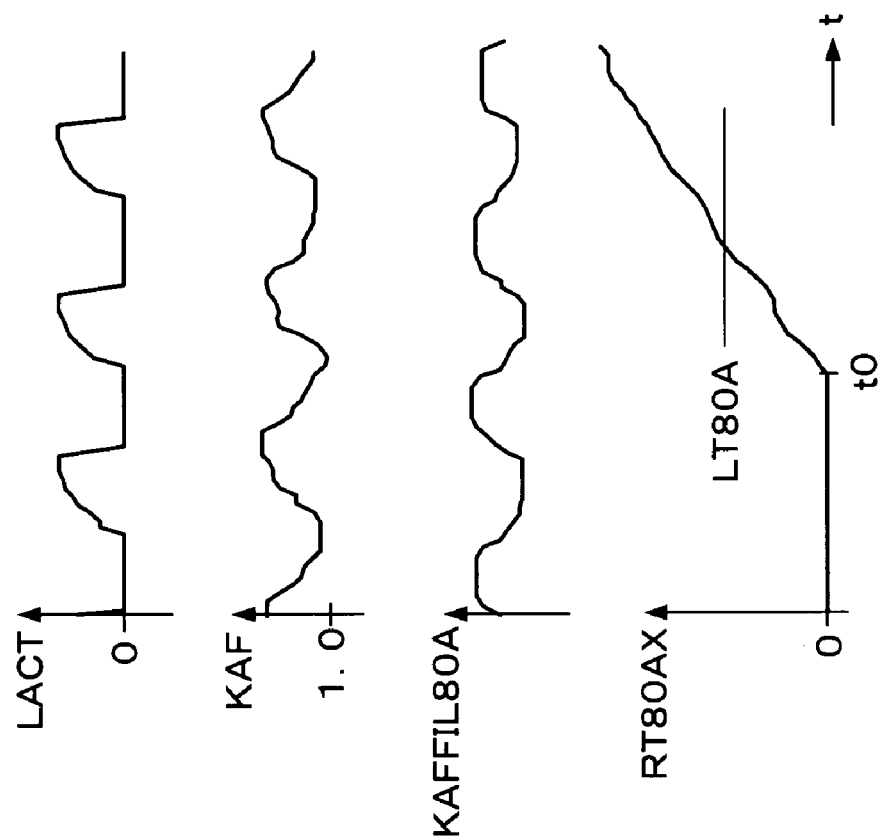
FIGS. 2A and 2B show graphs illustrating a failure determination method of the exhaust gas recirculation device in this embodiment.
Figure 2B:
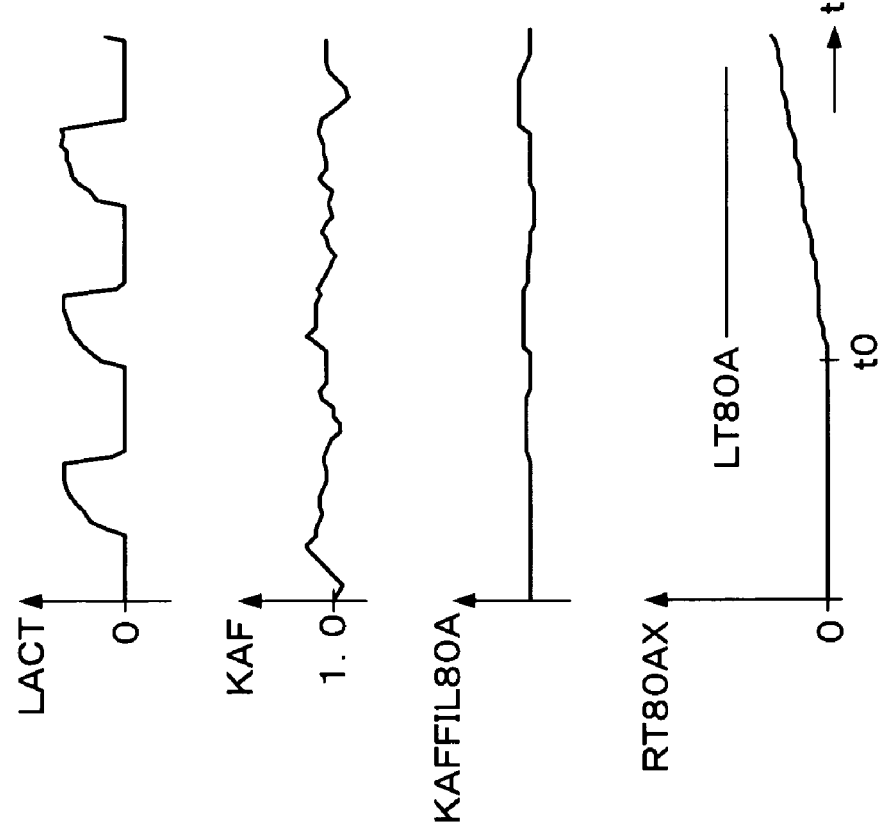

In this embodiment, a failure of the exhaust gas recirculation device, specifically whether or not a leak (break) is present in the recirculation passage 21, determined with the method described below. FIGS. 2A and 2B show graphs for explaining the determination method. FIG. 2A corresponds to an example where the exhaust gas recirculation device is normal. FIG. 2B corresponds to an example where a leak is present in the exhaust gas recirculation device. In this embodiment, the valve lift amount LACT of the EGR valve 22 is changed as shown in FIGS. 2A and 2B. The determination of whether a leak is present is performed based on a changing component in the air-fuel ratio correction coefficient KAF upon changing the valve lift amount LACT.

When the exhaust gas recirculation device is normal, the air-fuel ratio correction coefficient KAF always takes a value in the vicinity of "1.0" even if the valve lift amount LACT is changed. This is because the EGR correction coefficient KEGR changes in response to the change in the valve lift amount LACT. For example, if the valve lift amount LACT is increased, the exhaust gas recirculation amount increases and the intake air flow rate of the engine 1 decreases. In response to the increase of the valve lift amount LACT, the EGR correction coefficient KEGR decreases. Consequently, the air-fuel ratio correction coefficient KAF remains in the vicinity of "1.0".

On the other hand, when a leak is in the exhaust gas recirculation device, the air-fuel ratio correction coefficient KAF changes with the change in the valve lift amount LACT if the valve lift amount LACT is changed as shown in FIG. 2B. This is based on the following reason. When a leak is present in the exhaust gas recirculation device, if the valve lift amount LACT of the EGR valve 22 is controlled to increase gases including exhaust gases and fresh air flow into the intake pipe 2. Consequently, the correction by the EGR correction coefficient KEGR becomes excessive, so that the air-fuel ratio shifts in the lean direction, and the air-fuel ratio correction coefficient KAF increases to correct the shift of the air-fuel ratio. Therefore, the air-fuel ratio correction coefficient KAF changes in a cycle which is substantially equal to the cycle of the change in the valve lift amount LACT.

Therefore, in this embodiment, a filtered correction coefficient KAFFIL80A is calculated by performing band pass filtering of the air-fuel ratio correction coefficient KAF calculated when changing the valve lift amount LACT. Further, an accumulated value RT80AX is calculated by accumulating the absolute value of the filtered correction coefficient KAFFIL80A. When the accumulated value RT80AX exceeds a determination threshold value LT80A, it is determined that a leak is present in the exhaust gas recirculation device.

Figure 3:
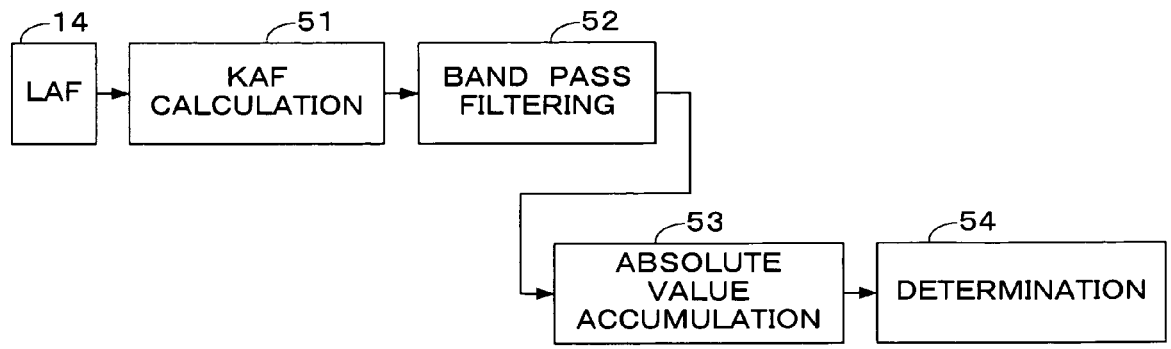
FIG. 3 is a functional block diagram showing a configuration of a module which performs the failure determination.

FIG. 3 is a functional block diagram showing a module for executing a failure diagnosis process including the leak determination. The function of each block is realized by operation processes executed by the CPU in the ECU 5.

The failure diagnosing module shown in FIG. 3 includes a KAF calculation section 51, a band pass filtering section 52, an absolute value accumulation section 53, and a determination section 54. The KAF calculation section 51 calculates the air-fuel ratio correction coefficient KAF so that the detected equivalent ratio KACT may become equal to the target equivalent ratio KCMD. The band pass filtering section 52 performs the band pass filtering of the air-fuel ratio correction coefficient KAF, and outputs the filtered correction coefficient KAFFIL80A. The absolute value accumulation section 53 accumulates the absolute value of the filtered correction coefficient KAFFIL80A, to calculate the determination parameter RT80A. The determination section 54 compares the determination parameter RT80A with the determination threshold value LT80A, and determines that a leak is present in the exhaust gas recirculation device, when the determination parameter RT80A exceeds the determination threshold value LT80A.

Figure 4:
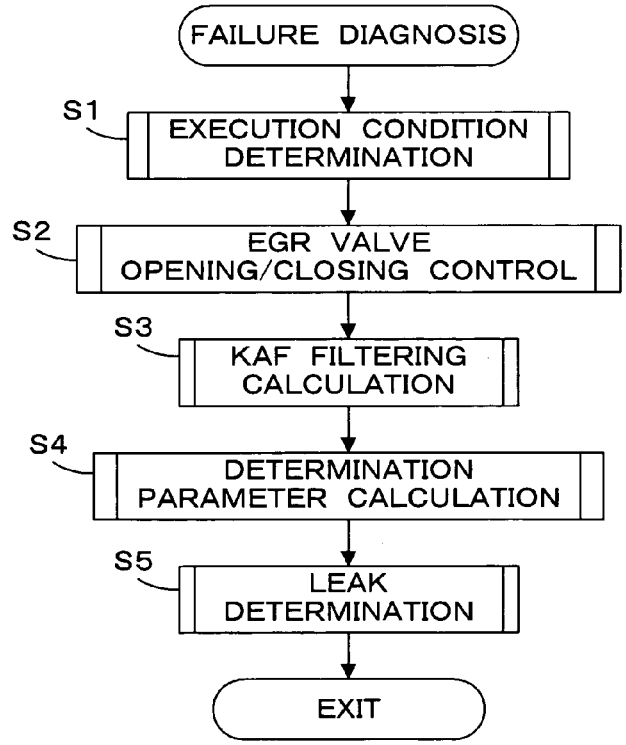
FIG. 4 is a flowchart of a process for performing the failure determination.

FIG. 4 is a flowchart illustrating a process of the above-described failure diagnosis. This process is executed at predetermined time intervals (e.g., 10 milliseconds) by the CPU in the ECU 5.

Figure 5:
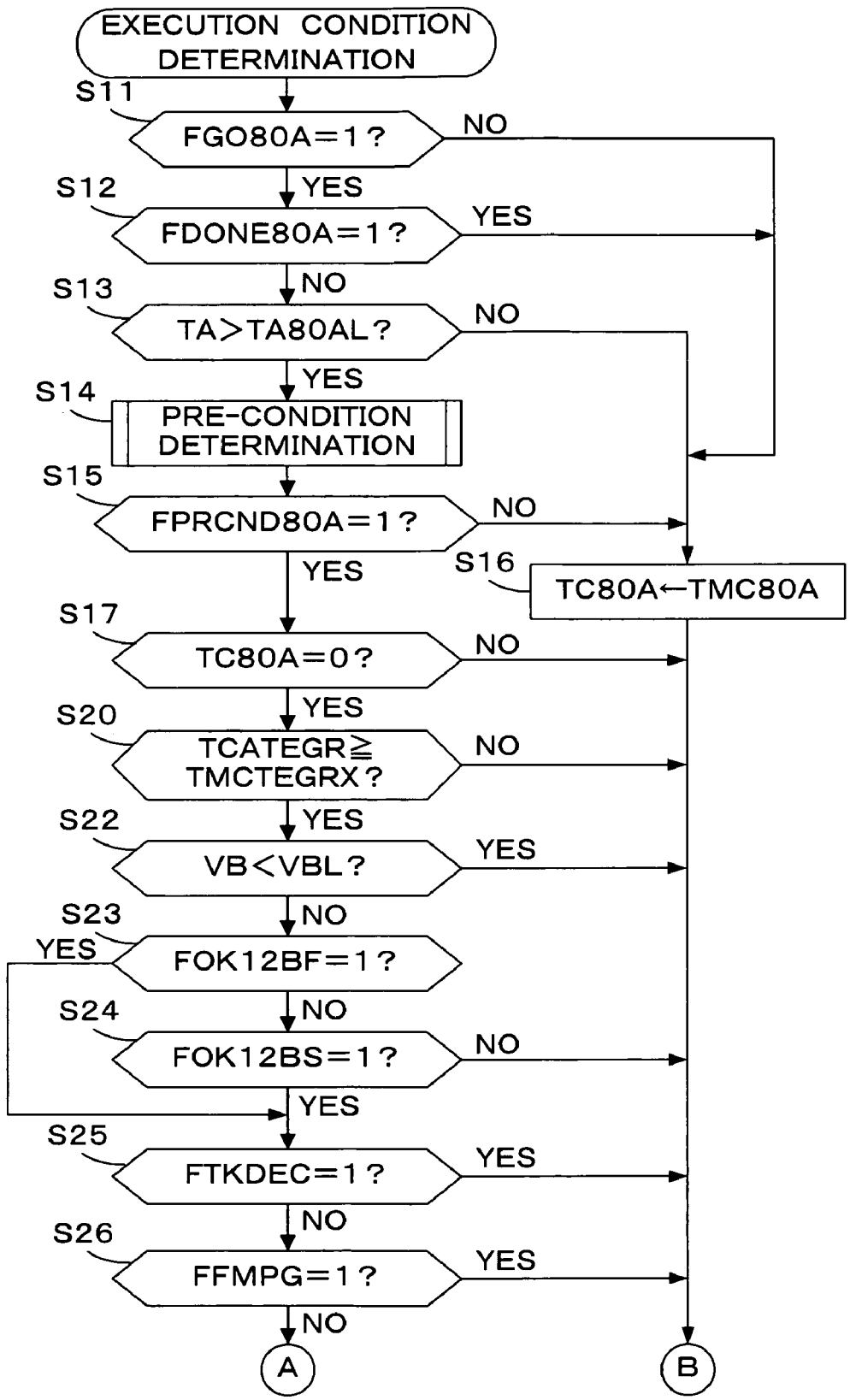
FIGS. 5 and 6 show a flowchart of a process for determining an execution condition of the failure determination.
Figure 6:
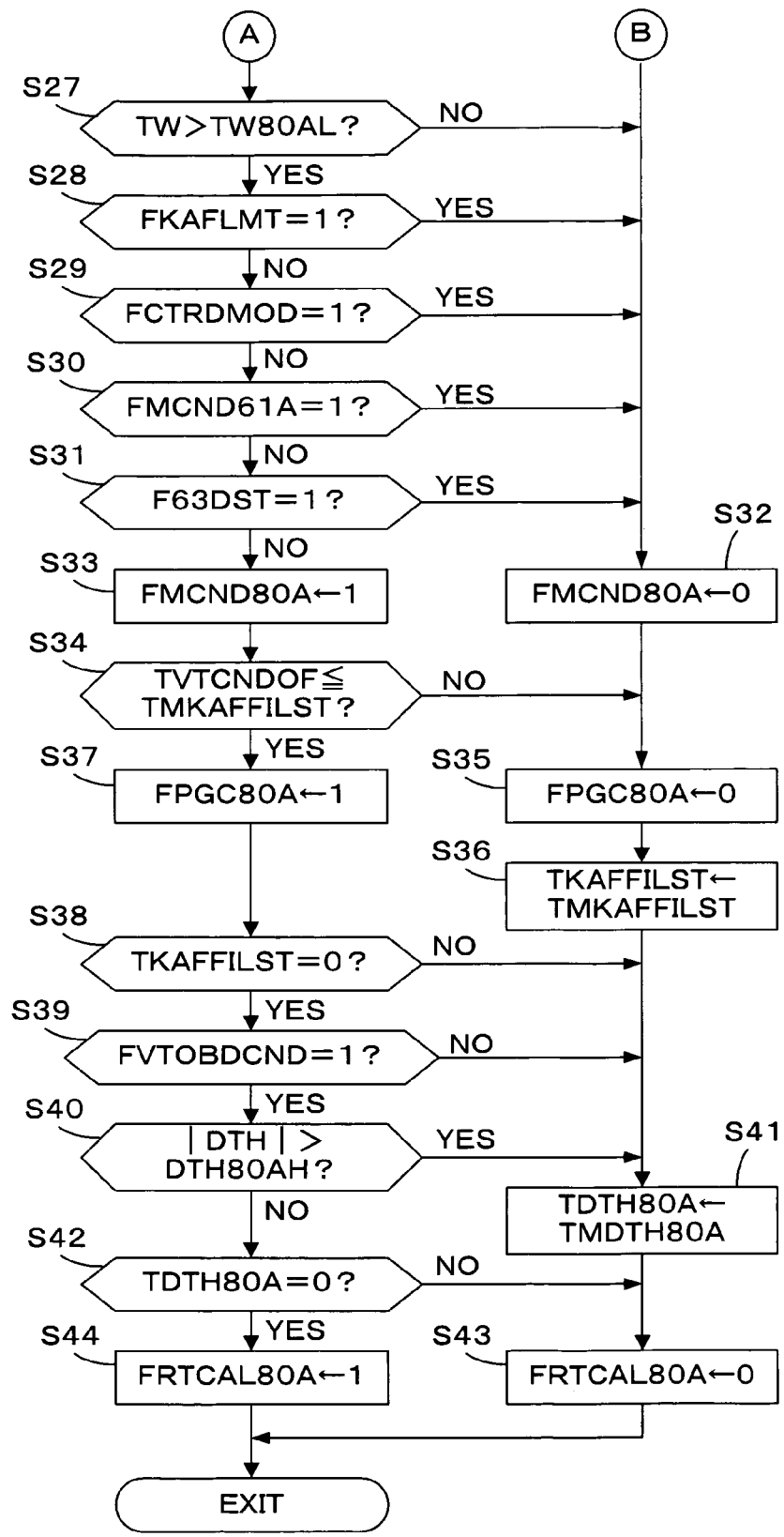
Figure 8:
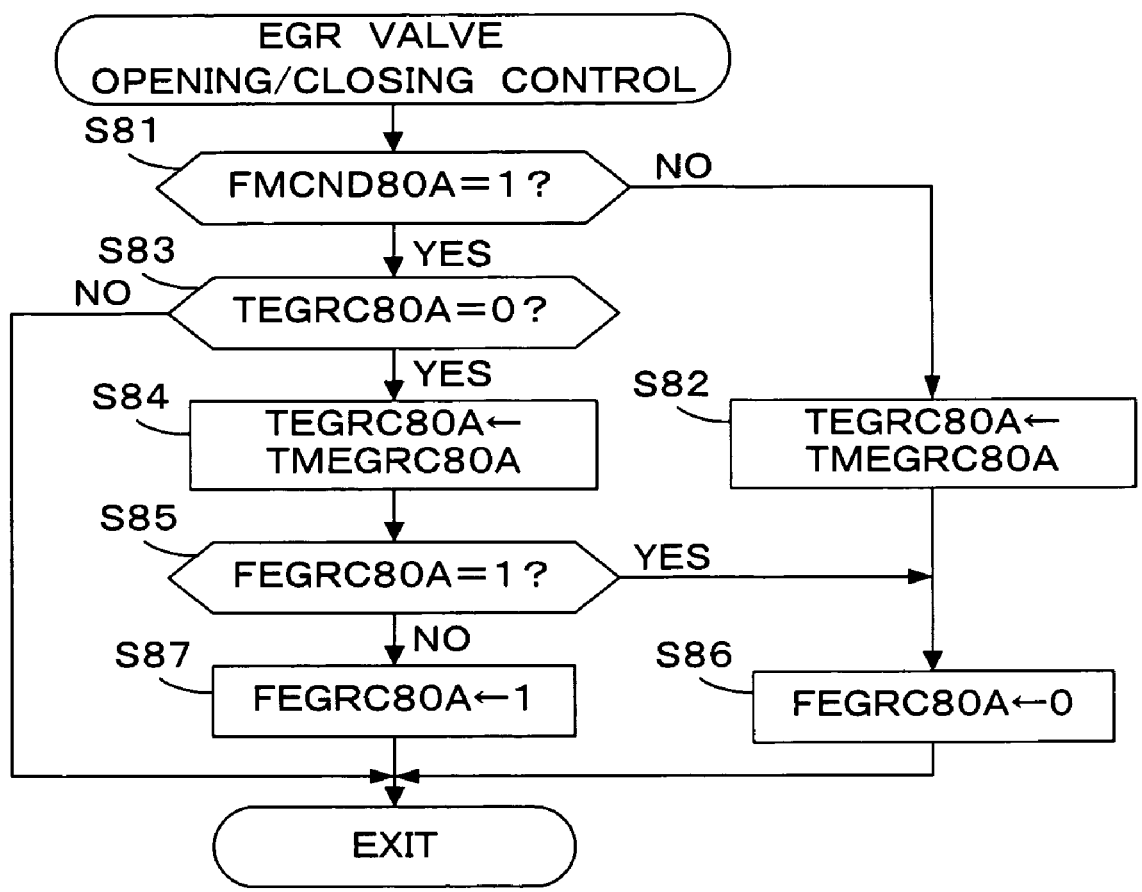
FIG. 8 is a flowchart of a process for performing the opening and closing control of the exhaust gas recirculation control valve.
Figure 9:
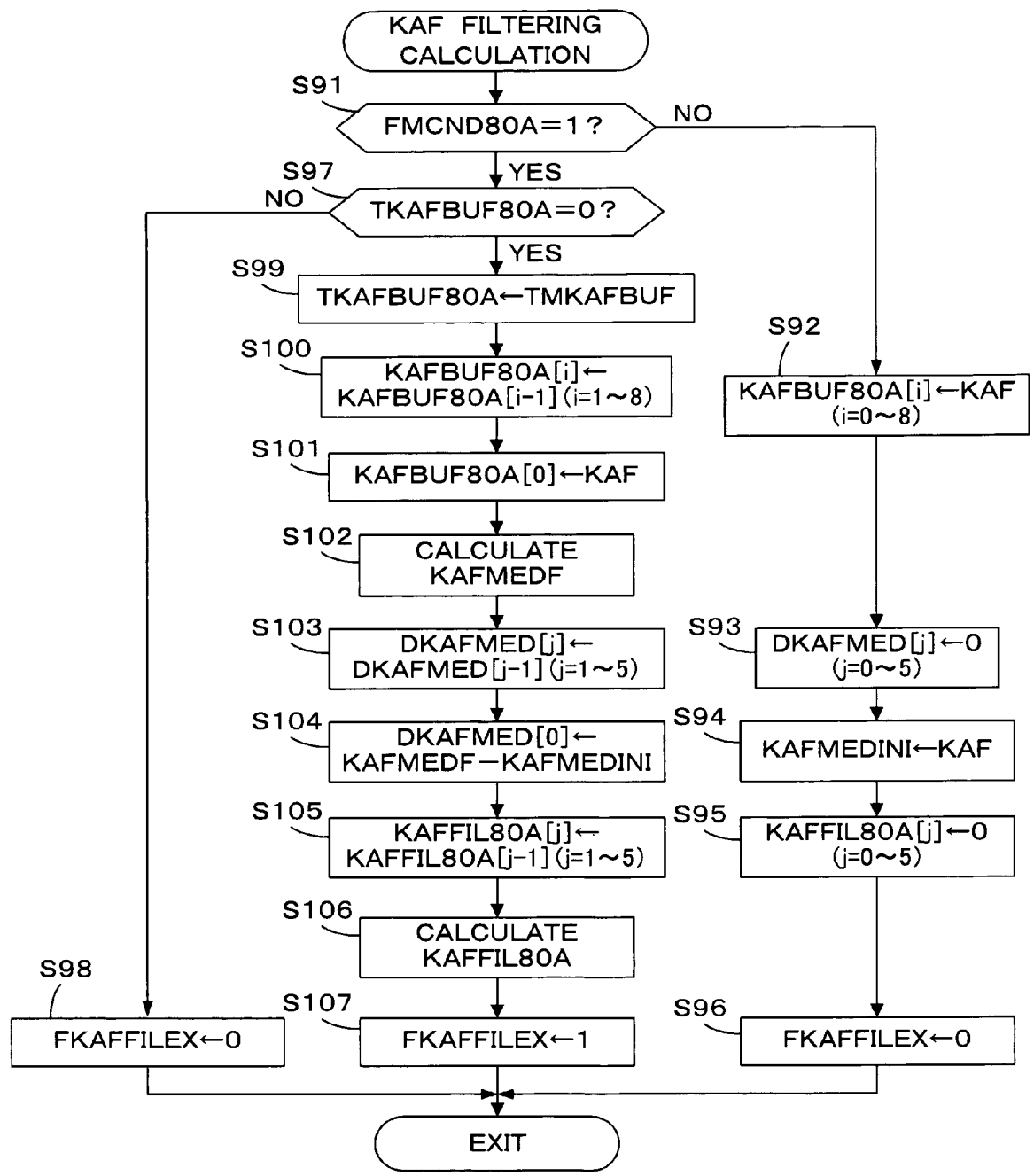
FIG. 9 is a flowchart of a process for performing filtering calculation of an air-fuel ratio correction coefficient (KAF)
Figure 10:
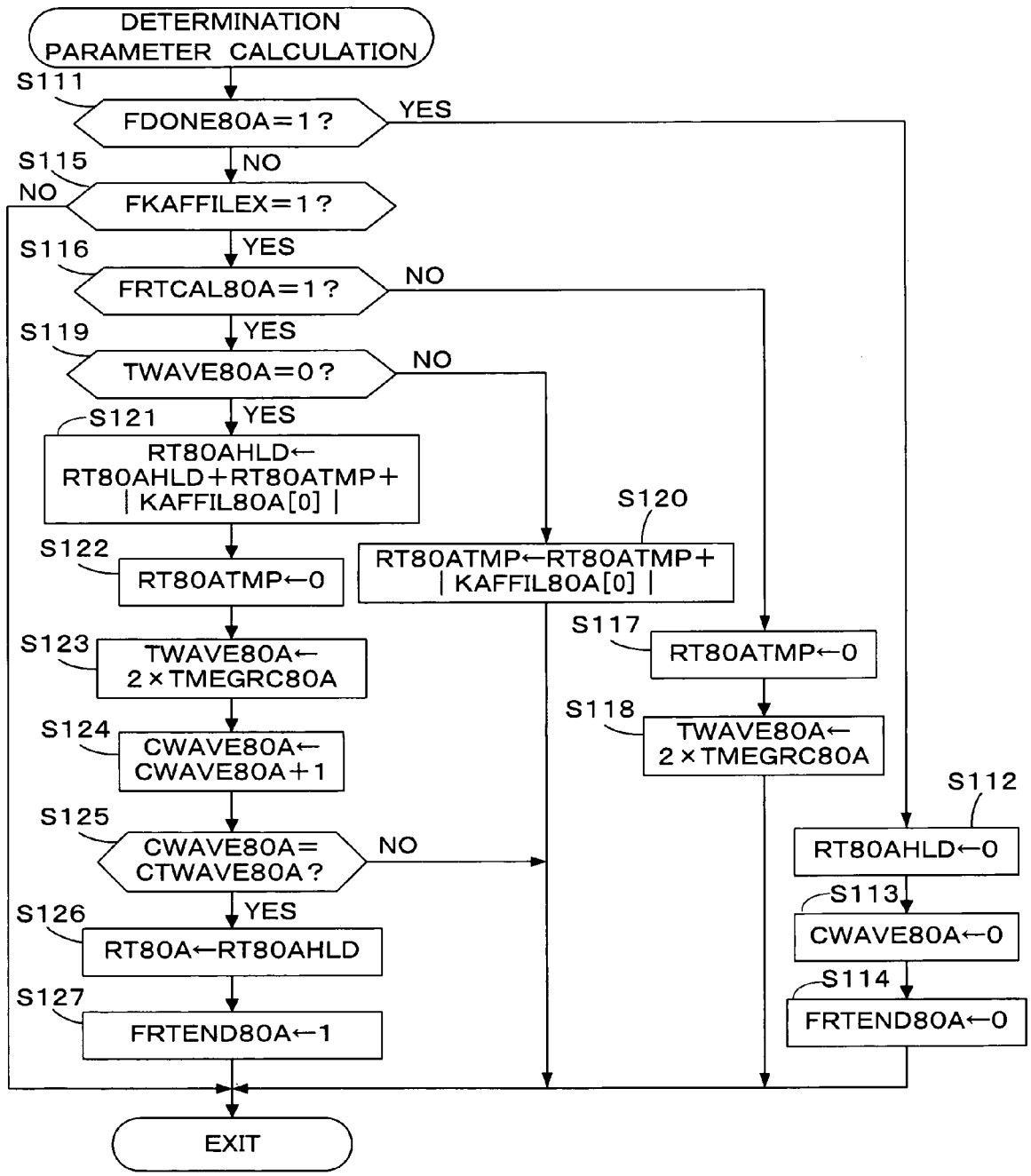
FIG. 10 is a flowchart of a process for calculating a determination parameter (RT80A)
Figure 11:
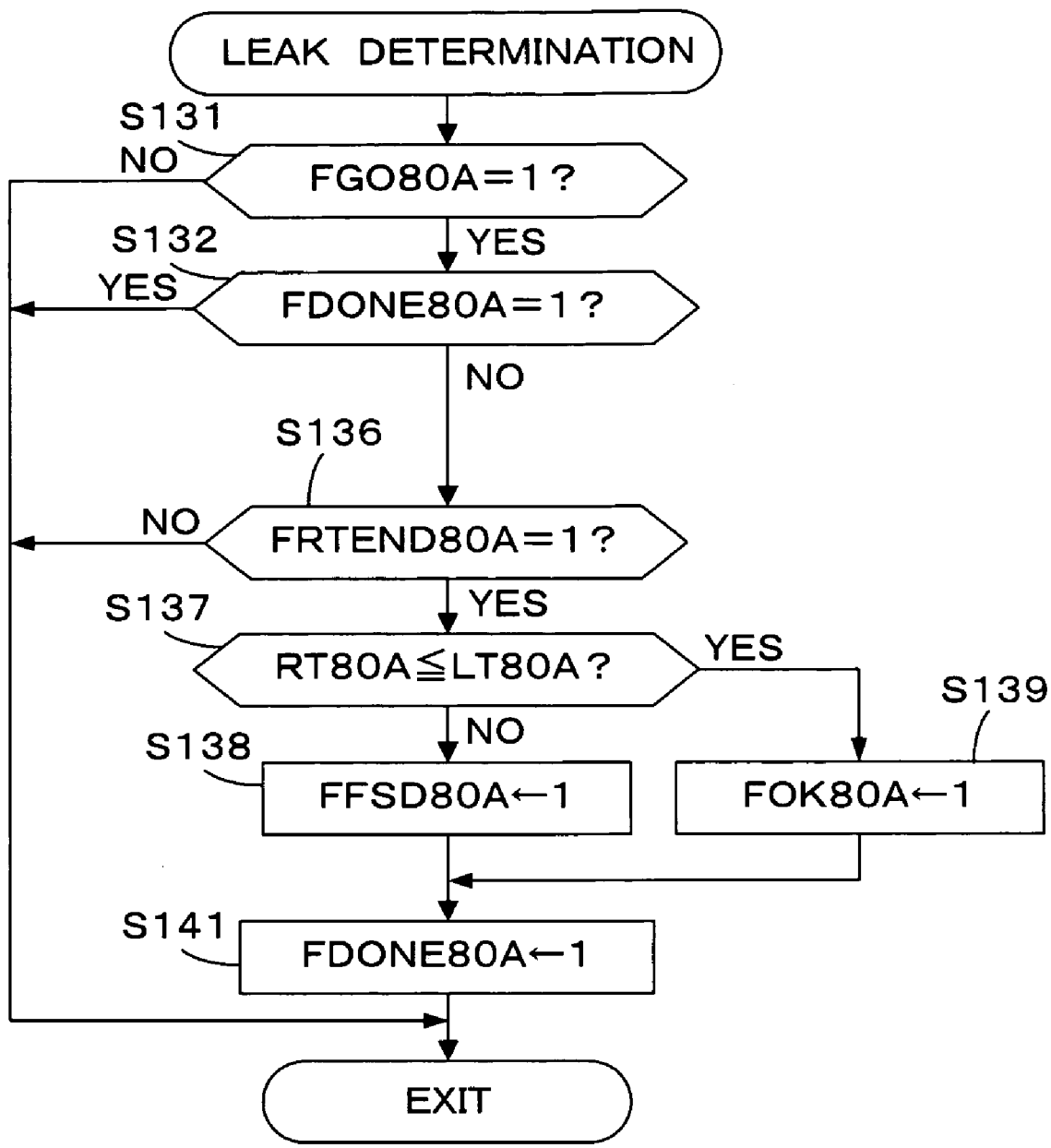
FIG. 11 is a flowchart of a process for performing a leak determination.

In step S1, an execution condition determination process shown in FIGS. 5 and 6 is executed. In step S2, an EGR valve opening and closing control process shown in FIG. 8 is executed. In step S3, a KAF filtering calculation process shown in FIG. 9 is executed. In step S4, a determination parameter calculation process shown in FIG. 10 is executed. In step S5, a leak determination process shown in FIG. 11 is executed.

FIGS. 5 and 6 are flowcharts illustrating the execution condition determination process executed in step S1 of FIG. 4.

In step S11, it is determined whether or not an execution permission flag FGO80A is "1". When the failure diagnosis of the exhaust gas recirculation device is permitted by another process not shown, the execution permission flag FGO80A is set to "1". If the execution permission flag FGO80A is "1", it is determined whether or not a determination end flag FDONE80A is "1" (step S12). Since the answer to step S12 is initially negative (NO), the process proceeds to step S13, in which it is determined whether or not an intake air temperature TA is higher than a predetermined intake air temperature TA80AL (e.g., 0 degree Centigrade).

If the answer to step S11 or S13 is negative (NO), or if the answer to step S12 becomes affirmative (YES), the process proceeds to step S16, in which a downcount timer TC80A is set to a predetermined time TMC80A (e.g., 2 seconds) and started. Thereafter, the process proceeds to step S32 (FIG. 6), in which an execution condition flag FMCND80A is set to "0".

Figure 7:
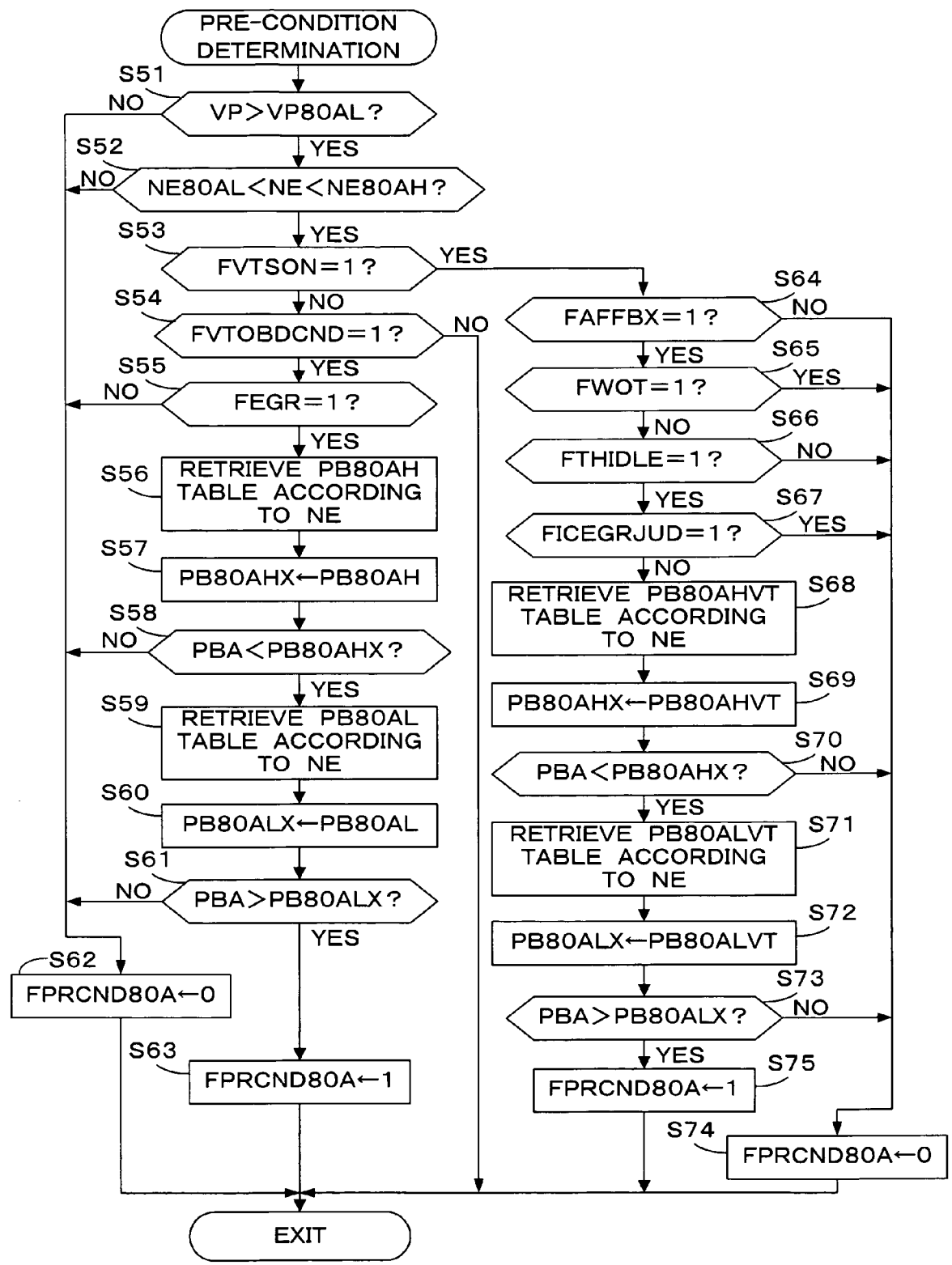
FIG. 7 is a flowchart of a process for determining a pre-condition of the failure determination.

If TA is higher than TA80AL in step S13, a pre-condition determination process shown in FIG. 7 is executed (step S14). If a pre-condition is satisfied in the pre-condition determination process, a pre-condition flag FPRCND80A is set to "1". In step S15, it is determined whether or not the pre-condition flag FPRCND80A is "1". If the answer to step S15 is negative (NO), the process proceeds to step S16. If the pre-condition is satisfied, the process proceeds from step S15 to step S17, in which it is determined whether or not the value of the timer TC80A started in step S16 is "0". Since the answer to step S17 is initially negative (NO), the process proceeds to step S32, in which the execution condition flag FMCND80A is set to "0".

If the value of the timer TC80A becomes "0", the process proceeds to step S20, in which it is determined whether or not a value of an upcount timer TCATEGR is equal to or greater than a predetermined time period TMCTEGRX (e.g., 10 seconds). The upcount timer TCATEGR is a timer for measuring an elapsed time period from the time the exhaust gas recirculation is started. If the answer to step S20 is affirmative (YES), it is determined whether or not the battery voltage VB is lower than a predetermined low voltage VBL (e.g., 10.5 V) (step S22).

If the answer to step S22 is negative (NO), it is determined whether or not a first normal flag FOK12BF is "1" (step S23). If the answer to step S23 is negative (NO), it is determined whether or not a second normal flag FOK12BS is "1" (step S24). The first and second normal flags FOK12BF and FOK12BS are set to "1" when the exhaust gas recirculation device is determined to be normal by another failure diagnosis process. The answer to step S23 or S24 is affirmative (YES), the process proceeds to step S25.

In step S25, it is determined whether or not a decompression flag FTKDEC is "1". The decompression flag FTKDEC is set to "1" when the pressure in the evaporative fuel processing system is reduced in the failure diagnosis process of the evaporative fuel processing system. If the answer to step S25 is negative (NO), it is determined whether or not a purge cut flag FFMPG is "1" (step S26). The purge cut flag FFMPG is set to "1" when the evaporative fuel purging from the canister 32 to the intake pipe 2 is not executed.

If the answer to step S26 is negative (NO), it is determined whether or not the engine coolant temperature TW is higher than a predetermined coolant temperature TW80AL (e.g., 70 degrees Centigrade) (FIG. 6, step S27). If the answer to step S27 is affirmative (YES), it is determined whether or not a limit flag FKAFLMT is "1" (step S28). The limit flag FKAFLMT is set to "1" when the state where the air-fuel ratio correction coefficient KAF is fixed to an upper limit value or a lower limit value is detected. If the answer to step S28 is negative (NO), it is determined whether or not a reduction mode flag FCTRDMOD is "1" (step S29). The reduction mode flag FCTRDMOD is set to "1" when an enrichment of the air-fuel ratio is performed in order to reduce NOx adsorbed in the exhaust gas purifying catalyst 16.

If the answer to step S29 is negative (NO), it is determined whether or not a first response deterioration determination flag FMCND61A is "1" (step S30). The first response deterioration determination flag FMCND61A is set to "1" when a response deterioration determination process of the LAF sensor 14 is executed. If the answer to step S30 is negative (NO), it is determined whether or not a second response deterioration determination flag F63DST is "1" (step S31). The second response deterioration determination flag F63DST is set to "1" when a response deterioration determination process of an oxygen concentration sensor (not shown) disposed downstream of the exhaust gas purifying catalyst 16.

If the answer to step S17, S20, S24, or S27 described above is negative (NO), or if the answer to step S22, S25, S26, or any one of steps S28–S31 is affirmative (YES), it is determined that the execution condition is not satisfied, and the execution condition flag FMCND80A is set to "0" (step S32). Subsequently, a purge cut command flag FPGC80A is set to "0" (step S35), and a downcount timer TKAFFILST is set to a predetermined time period TMKAFFILST (e.g., 4 seconds) and started (step S36). In step S41, a downcount timer TDTH80A is set to a predetermined time period TMDTH80A (e.g., 2 seconds) and started. Further, an accumulating calculation flag FRTCAL80A is set to "0" (step S43). Thereafter, the process ends. The accumulating calculation flag FRTCAL80A is referred to in step S116 of FIG. 10. If the accumulating calculation flag FRTCAL80A is "0", an accumulating calculation of the absolute value of the filtered correction coefficient KAFFIL80A is interrupted.

On the other hand, if the answer to step S31 is negative (NO), it is determined that the execution condition is satisfied, and the execution condition flag FMCND80A is set to "1" (step S33). In step S34, it is determined whether a value of a downcount timer TVTCNDOF is less than or equal to the predetermined time period TMKAFFILST. The downcount timer TVTCNDOF is set to a predetermined time period TMVTCNDOF (e.g., 5 seconds) and started at the time the closing timing of the intake valve is switched by the valve timing switching mechanism 30. If the answer to step S34 is negative (NO), the process proceeds to step S35. If TVTCNDOF is less than or equal to TMKAFFILST in step S35, the purge cut command flag FPGC80A is set to "1" (step S37). As a result, the purge control valve 33 is closed, and the supply of the evaporative fuel to the intake pipe 2 is stopped, thereby preventing incorrect determination due to the supply of the evaporative fuel to the intake pipe 2.

In step S38, it is determined whether or not the value of the timer TKAFFILST started in step S36 is "0". While the answer to step S38 is negative (NO), the process proceeds to step S41. If TKAFFILST becomes "0", the process proceeds to step S39, in which it is determined whether or not a VT-changed permission flag FVTOBDCND is "1". The VT-changed permission flag FVTOBDCND is set to "1" when permitting an execution of the accumulating calculation (calculation of a determination parameter) after the closing timing of the intake valve is changed to the normal closing timing. That is, the VT-changed permission flag FVTOBDCND is "0" immediately after the transition to the normal closing timing. When a predetermined time period (e.g., 5 seconds) has elapsed from the transition, the VT-changed permission flag is set to "1".

If the answer to step S39 is affirmative (YES), it is determined whether or not the absolute value of a change amount DTH (=TH(n)–TH (n–1), "n" is a control time digitized with the control period) of the throttle valve opening TH is greater than a predetermined change amount DTH80AH (e.g., 0.5 deg/TDC, "TDC" is a time period of generation of the TDC pulse) (step S40). The answer to step S39 is negative (NO) or the answer to step S40 is affirmative (YES), the process proceeds to step S41.

If |DTH| is equal to or less than DTH80ATH in step S40, it is determined whether or not the value of the timer TDTH80A started in step S41 is "0" (step S42). While TDTH80A is greater than "0", the process proceeds to step S43. If TDTH80A becomes "0", the accumulating calculation flag FRTCAL80A is set to "1" (step S44).

Even if the execution condition is satisfied (FMCND80A=1), the accumulating calculation of the absolute value of the filtered correction coefficient KAFFIL80A is interrupted by steps S40 to S42, when the change amount of the throttle valve opening TH is great. This prevents incorrect determination due to influence of the change in the throttle valve opening TH.

FIG. 7 is a flowchart illustrating the pre-condition determination process executed in step S14 of FIG. 5.

In step S51, it is determined whether or not the running speed VP is higher than a predetermined running speed VP80AL (e.g., 41 km/h). If the answer to step S51 is affirmative (YES), it is determined whether or not the engine rotational speed NE is higher than a minimum rotational speed NE80AL (e.g., 1500 rpm) and lower than a maximum rotational speed NE80AH (e.g., 4000 rpm). If the answer to step S51 or S52 is negative (NO), it is determined that the pre-condition is not satisfied, and the pre-condition flag FPRCND80A is set to "0" (step S62).

If the answer to step S52 is affirmative (YES), it is determined whether or not a retard timing flag FVTSON is "1" (step S53). If the answer to step S52 is negative (NO), indicating that the normal closing timing is selected, it is determined whether or not the VT-changed permission flag FVTOBDCND is "1" (step S54). While the answer to step S54 is negative (NO), the process ends immediately. If the answer to step S54 becomes affirmative (YES), the process proceeds to step S55.

In step S55, it is determined whether or not an EGR flag FEGR is "1". If FEGR is equal to "0", indicating that the engine is operating in the engine operating condition where the exhaust gas recirculation cannot be performed, the process proceeds to step S62. If the EGR flag FEGR is "1", indicating that the engine is operating in the engine operating condition where the exhaust gas recirculation can be performed, a PB80AH table (not shown) is retrieved according to the engine rotational speed NE, to calculate a first intake pressure threshold value PB80AH (step S56). Subsequently, an intake pressure upper limit value PB80AHX is set to the first intake pressure threshold value PB80AH (step S57). Next, it is determined whether or not the absolute intake pressure PBA is lower than the intake pressure upper limit value PB80AHX (step S58). If the answer to step S58 is negative (NO), the process proceeds to step S62.

In step S58, if PBA is lower than PB80AHX, a PB80AL table (not shown) is retrieved according to the engine rotational speed NE, to calculate a second intake pressure threshold value PB80AL (step S59). Subsequently, an intake pressure lower limit PB80ALX is set to the second intake pressure threshold value PB80AL (step S60). Next, it is determined whether the absolute intake pressure PBA is higher than the intake pressure lower limit PB80ALX (step S61). If the answer to step S61 is negative (NO), the process proceeds to step S62. In step S61, if PBA is higher than PB80ALX, it is determined that the pre-condition is satisfied, and the pre-condition flag FPRCND80A is set to "1" (step S63).

If FVTSON is equal to "1" in step S53, indicating that the retarded closing timing is selected, it is determined whether or not a feedback control flag FAFFBX is "1" (step S64). The feedback control flag FAFFBX is set to "1" when the air-fuel ratio feedback control according to the output of the LAF sensor 14 is performed. If the answer to step S64 is affirmative (YES), it is determined whether or not a high load operation flag FWOT is "1" (step S65). The high load operation flag FWOT is set to "1" in the high load operating condition where the throttle valve 3 is substantially fully opened.

If the answer to step S65 is negative (NO), it is determined whether or not a non-idling flag FTHIDLE is "1" (step S66). The non-idling flag FTHIDLE is set to "1" when the throttle valve opening TH is greater than or equal to an idling determination opening THIDLE. If the answer to step S66 is affirmative (YES), it is determined whether or not a low temperature flag FICEGRJUD is "1" (step S67). The low temperature flag FICEGRJUD is set to "1" when the temperature in the intake pipe 2 has decreased to "0" degree centigrade or lower.

The answer to step S64 or S66 is negative or the answer to step S65 or S67 is affirmative, it is determined that a pre-condition is not satisfied, and the pre-condition flag FPRCND80A is set to "0" (step S74).

If the answer to step S67 is negative (NO), a PB80AHVT table (not shown) is retrieved according to the engine rotational speed NE, to calculate a 3rd intake pressure threshold value PB80AHVT (step S68). The PB80AHVT table is set so that the intake pressure threshold value corresponding to the same engine rotational speed NE may become higher as compared with the PB80AH table.

In step S69, the intake pressure upper limit value PB80AHX is set to the 3rd intake pressure threshold value PB80AHVT. Next, it is determined whether or not the absolute intake pressure PBA is lower than the intake pressure upper limit value PB80AHX (step S70). If the answer to step S70 is negative (NO), the process proceeds to step S74.

If PBA is lower than PB80AHX in step S70, a PB80ALVT table (not shown) is retrieved with step S70 according to the engine rotational speed NE, to calculate a 4th intake-pressure threshold value PB80ALVT (step S71). The PB80ALVT table is set so that the intake pressure threshold value corresponding to the same engine rotational speed NE may become higher as compared with the PB80AL table.

In step S72, the intake pressure lower limit PB80ALX is set to the 4th intake pressure threshold value PB80ALVT. Next, it is determined whether or not the absolute intake pressure PBA is higher than the intake pressure lower limit PB80AX (step S73). If the answer to step S73 is negative (NO), the process proceeds to step S74. If PBA is higher than PB80ALX in step S73, the pre-condition is determined to be satisfied, and the pre-condition flag FPRCND80A is set to "1" (step S75).

In this embodiment, when the closing timing of the intake valve is set to the retarded closing timing (FVTSON=1), the pre-condition is satisfied (step S75). Further, when the execution condition flag FMCND80A is set to "1" (step S33) in the process shown in FIGS. 5 and 6, a command for switching the closing timing of the intake valve to the normal closing timing is issued in a valve timing control process which is not shown. Accordingly, the closing timing of the intake valve is switched to the normal closing timing (the retard timing flag FVTSON is returned to "0"). This is because the engine operating region where the execution condition of the exhaust gas recirculation is satisfied becomes narrower, and the failure diagnosis of the exhaust gas recirculation device becomes harder to be performed, if the closing timing of the intake valve is set to the retarded closing timing. By forcibly switching the intake valve closing timing to the normal closing timing, the failure diagnosis can certainly be performed.

FIG. 8 is a flowchart illustrating the EGR valve opening and closing control process executed in step S2 of FIG. 4.

In step S81, it is determined whether or not the execution condition flag FMCND80A is "1". If the answer to step S81 is negative (NO), the downcount timer TEGRC80A is set to a predetermined time period TMEGRC80A (e.g., 1 second) and started (step S82). Subsequently, the valve closing flag FEGRC80A is set to "0" (step S86), and the process ends. If the valve closing flag FEGRC80A is "0", the EGR valve 22 is opened and the exhaust gas recirculation is performed.

If the execution condition flag FMCND80A is set to "1", the process proceeds from step S81 to step S83, in which it is determined whether or not the value of the timer TEGRC80A started in step S82 is "0". While the answer to step S83 is negative (NO), the process immediately ends. If TEGRC80A becomes equal to "0", the process proceeds to step S84, in which the timer TEGRC80A is set to the predetermined time period TMEGRC80A and started.

In step S85, it is determined whether or not the valve closing flag FEGRC80A is "1". Since the answer to step S85 is initially negative (NO), the process proceeds to step S87, in which the valve closing flag FEGRC80A is set to "1".

Thereafter, every time the value of the timer TEGRC80A becomes "0", step S86 or S87 is alternately executed. Accordingly, the EGR valve 22 is opened and closed in a constant cycle.

FIG. 9 is a flowchart illustrating the KAF filtering calculation process executed in step S3 of FIG. 4.

In step S91, it is determined whether or not the execution condition flag FMCND80A is "1". If the answer to step S91 is negative (NO), each of a KAF stored value KAFBUF80A [i] (i=0 to 8) is set to the present value of the air-fuel ratio correction coefficient KAF (step S92). The parameter "i" represents a memory address. The value "0" of the parameter "i" corresponds to the present value, and the KAF stored value KAFBUF80A [i] becomes older as the parameter "i" increases.

Further, each of a change amount stored value DKAFMED [j] (j=0 to 5) is set to "0" (step S93). The change amount stored value DKAFMED is a stored value of a difference between a median KAFMEDF of the KAF stored value KAFBUF80A [i] and an initial median KAFMEDINI calculated in the process described below. The difference (KAFMEDF−KAFMEDINI) will be hereinafter referred to as "median change amount". Further, the parameter "j" represents a memory address like the parameter "i". That is, the value "0" of the parameter "j" corresponds to the present value, and the change amount stored value DKAFMED [j] becomes older as the parameter "j" increases.

In step S94, the initial median KAFMEDINI is set to the present value of the air-fuel ratio correction coefficient KAF. Further, each of a filtered KAF stored value KAFFIL80A [j] (j=0 to 5) is set to "0" (step S95). Thereafter, a filtering calculation flag FKAFFILEX is set to "0" (step S96). Then the process ends.

If the execution condition flag FMCND80A is set to "1", the process proceeds from step S91 to step S97, in which it is determined whether or not the value of a downcount timer TKAFBUF80A is "0". Since the answer to step S97 is initially affirmative (YES), the timer TKAFBUF80A is set to a predetermined time period TMKAFBUF (e.g., 0.1 seconds) and started (step S99). Subsequently, each of the KAF stored value KAFBUF80A [i] (i=1 to 8) is set to the KAF stored value KAFBUF80A [i−1] (step S100), and the KAF stored value KAFBUF80A [0] is set to the present value of the air-fuel ratio correction coefficient KAF (step S101).

In step S102, the median KAFMEDF of the KAF stored value KAFBUF80A [i] is calculated. That is, nine KAF stored values (i=0 to 8) are arranged in descending order, and the median KAFMEDF is set to the 5th value from the maximum. The process for calculating the median is a low pass filtering process to attenuate high frequency components like a process for calculating an average value of nine data.

In step S103, each of the change amount stored value DKAFMED [j] (j=1 to 5) is set to the change amount stored value DKAFMED [j−1]. In step S104, the change amount stored value DKAFMED [0] is set to the median change amount (KAFMEDF−KAFMEDINI) calculated in step S102. In step S105, each of the filtered KAF stored value KAFFIL80A [j] (j=1 to 5) is set to the filtered KAF stored value KAFFIL80A [j−1]. In step S106, the filtered KAF stored value KAFFIL80A [0], i.e., the filtered correction coefficient KAFFIL80A, is calculated by the following equation (2).

$$KAFFIL80A[0] = \sum_{j=0}^{5} BHPF80A[j] \times DKAFMED[j] - \sum_{j=1}^{5} AHPF80A[j] \times KAFFIL80A[j] \quad (2)$$

where, BHPF80A [j] (j=0 to 5) and AHPF80A [j] (j=1 to 5) are filtering coefficients for realizing a high pass filtering characteristic.

In step S107, a filtering calculation flag FKAFFILEX is set to "1". Then the process ends.

Thereafter, while the answer to step S97 is negative (NO), the process proceeds from step S97 to step S98, in which the filtering calculation flag FKAFFILEX is set to "0". Thereafter, the process immediately ends. Therefore, the calculation of the filtered correction coefficient KAFFIL80A in steps S99–S107 is executed at predetermined time intervals of TMKAFBUF.

FIG. 10 is a flowchart illustrating the determination parameter calculation process executed in step S4 of FIG. 4.

In step S111, it is determined whether or not a determination end flag FDONE80A is "1". Since the answer to step S111 is initially negative (NO), the process proceeds to step S115, in which it is determined whether or not the filtering calculation flag FKAFFILEX is "1". If the answer to step S115 is negative (NO), the process immediately ends.

If the filtering calculation is executed in the process of FIG. 9 and the filtering calculation flag FKAFFILEX is set to "1", the process proceeds from step S115 to step S116, in which it is determined whether or not the accumulating calculation flag FRTCAL80A is "1". If the answer to step S116 is negative (NO), an accumulation parameter RT80ATMP is set to "0" (step S117), and a downcount timer TWAVE80A is set to a time period which is twice as much as the predetermined time period TMEGRC80A, i.e., the opening and closing cycle of the EGR valve 22, and started (step S118). Thereafter, the process ends.

If the accumulating calculation flag FRTCAL80A is set to "1", the process proceeds from step S116 to step S119, in which it is determined whether or not the value of the timer TWAVE80A started in step S118 is "0". Since the answer to step S119 is initially negative (NO), the process proceeds to step S120, in which the accumulating calculation is performed by adding the absolute value of the filtered correction coefficient KAFFIL80A [0] to the preceding value of the accumulation parameter RT80ATMP.

If one cycle of the opening and closing operation of the EGR valve 22 ends, the process proceeds from step S119 to step S121, in which the accumulation parameter RT80ATMP and the filtered correction coefficient KAFFIL80A [0] are applied to the following equation (3), to calculate an accumulation hold value RT80AHLD.

$$RT80AHLD = RT80AHLD + RT80ATMP + |KAFFIL80A[0]| \qquad (3)$$

where RT80AHLD on the right side is a preceding calculated value.

In step S122, the accumulation parameter RT80ATMP is returned to "0" and the timer TWAVE80A is started similarly as step S118 (step S123). Subsequently, the counter CWAVE80A is counted up by "1" (step S124) and it is determined whether or not the value of the counter CWAVE80A is equal to a predetermined number CTWAVE80A (e.g., 2) (step S125). Since the answer to step S125 is initially negative (NO), the process immediately ends. If the opening and closing operation of the EGR valve 22 is executed the predetermined number CTWAVE80A of times, the process proceeds from step S125 to step S126, in which the determination parameter RT80A is set to the accumulation hold value RT80AHLD. Subsequently an accumulating calculation end flag FRTEND80A is set to "1" (step S127). Thereafter, the process ends.

If the determination end flag FDONE80A is set to "1" in the process of FIG. 11, the process proceeds from step S111 to step S112, in which the accumulation hold value RT80AHLD is set to "0". Further, the value of the counter CWAVE80A is set to "0" (step S113), and the accumulating calculation end flag FRTEND80A is set to "0" (step S114). Thereafter, the process ends.

FIG. 11 is a flowchart illustrating the leak determination process executed in step S5 of FIG. 4.

In step S131, it is determined whether or not an execution permission flag FGO80A is "1". If the answer to step S131 is affirmative (YES), it is determined whether or not the end flag FDONE80A is "1" (step S132). Since the answer to step S132 is initially negative (NO), the process proceeds to step S136, in which it is determined whether or not the accumulating calculation end flag FRTEND80A is "1". If the answer to step S136 is negative (NO), the process immediately ends. If the accumulating calculation is completed in the process shown in FIG. 10, and the accumulating calculation end flag FRTEND80A is set to "1", the process proceeds from step S136 to step S137, in which it is determined whether or not the determination parameter RT80A is equal to or less than the determination threshold value LT80A. If the answer to step S137 is affirmative (YES), indicating that a change in the air-fuel ratio correction coefficient KAF is small (refer to FIG. 2A), the exhaust gas recirculation device is determined to be normal, and a normal determination flag FOK80A is set to "1" (step S139).

Further, if RT80A is greater than LT80A, indicating that the change in the air-fuel ratio correction coefficient KAF is great (refer to FIG. 2B), a leak is determined be present in the exhaust gas recirculation device, and a failure determination flag FSD80A is set to "1" (step S138).

In step S141, the determination end flag FDONE80A is set to "1". Thereafter, the process ends.

If the execution permission flag FGO80A is "0" or the determination end flag FDONE80A is "1", the process immediately ends.

FIGS. 12A–12I are time charts for illustrating the failure diagnosis process described above. In FIGS. 12F and 12H, the dashed lines showing changes in the air-fuel ratio correction coefficient KAF and the determination parameter RT80A correspond to an example where a leak is present in the device, and the solid lines correspond to an example where the device is normal.

When the execution condition is satisfied at time t1, the purge cut command flag FPGC80A is immediately set to "1" (FIG. 6, step S37), if the closing timing of the intake valve is set to the normal closing timing. Accordingly, the valve opening duty DUTY of the purge control valve 33 decreases gradually to "0" as shown in FIG. 12C. The opening and closing control of the EGR valve 22 is started at time t2 after the predetermined time period TMEGRC80A has elapsed from time t1 (FIGS. 12D and 12E) (refer to FIG. 8).

At time t3 when the predetermined time period TMKAFFILST has elapsed from time t1, the calculation of the accumulation parameter RT80ATMP is started (FIGS. 12B and 12H). In FIG. 12H, changes in the accumulated value RT80AX obtained by adding the accumulation parameter RT80ATMP and the accumulation hold value RT80AHLD, is shown for easy understanding.

At time t4 when the time period (2×TMEGRC80A) has elapsed from time t3, one cycle of the opening and closing control of the EGR valve 22 ends (FIGS. 12D and 12G). Since the execution condition becomes unsatisfied at time t5, the normal control is restarted, but the accumulation hold value RT80AHLD is maintained (FIG. 12H). The accumulation parameter RT80ATMP increases from time t4 to time t5, as shown by the thin line, but the accumulation for one cycle of the opening and closing control is not completed. Accordingly, the accumulation parameter RT80ATMP is not added to the accumulation hold value RT80AHLD, and the accumulation parameter RT80ATMP is returned to "0" (FIG. 10, steps S116 and S117).

If the execution condition is satisfied again at time t6, the calculation of the accumulation parameter RT80ATMP and the accumulation hold value RT80AHLD is started from time t7 when the predetermined time period TMKAFFILST has elapsed (FIG. 12H), similarly as described above. When there is a leak, the accumulated value RT80AX (=RT80ATMP+RT80AHLD) exceeds the determination threshold value LT80A between time t7 and time t8. At time t8, one cycle of the opening and closing control of the EGR valve 22 is completed, and the determination with the determination parameter RT80A is performed (FIG. 10, steps S125 to S127, FIG. 11, steps S136 and S137). Consequently, in the example shown by the dashed line, a leak is determined to be present in the device to set the flag FSD80A to "1" (FIG. 12I), while in the example shown by the solid line, the device is determined to be normal.

As described above, in this embodiment, the opening and closing control of the EGR valve 22 is performed, the filtered correction coefficient KAFFIL80A corresponding to the changing component of the air-fuel ratio correction coefficient KAF is calculated, and the determination parameter RT80A is calculated by accumulating the absolute value of the filtered correction coefficient KAFFIL80A. If the determination parameter RT80A exceeds the determination threshold value LT80A, a leak is determined to be present in the exhaust gas recirculation device. For example, when the opening and closing control of the EGR valve 22 is performed in a constant cycle, the air-fuel ratio correction coefficient KAF changes in the same cycle as the opening and closing control cycle, if a leak is present in the exhaust gas recirculation passage 21. Since the opening and closing control cycle is known, the changing component due to the presence of a leak can be accurately detected with the low pass filtering process by the median calculation, and the high pass filtering process, i.e., the band pass filtering process corresponding to the combination of both filtering processes. Consequently, the failure determination accuracy can be improved by a comparatively simple method.

In this embodiment, the ECU 5 constitutes the air-fuel ratio control means, the failure determining means, the filtering means, the execution condition determining means, and the EGR correction means. More specifically, the process for calculating the air-fuel ratio correction coefficient KAF according to the output of the LAF sensor 14 and calculating the fuel injection period TOUT by the equation (1), corresponds to the air-fuel ratio control means. The process shown in FIG. 4 corresponds to the failure determining means. Further, the process shown in FIG. 9 corresponds to the filtering means, and the process shown in FIGS. 5 to 7 corresponds to the execution condition determining means. Further, the process for calculating the EGR correction coefficient KEGR, which is applied to the equation (1), according to the valve lift amount LACT of the EGR valve 22, and calculating the fuel injection period TOUT by the equation (1) corresponds to the EGR correction means.

The present invention is not limited to the above described embodiment, but various modifications may be made. For example, in the above embodiment, the speed density system in which the basic fuel amount TIM is calculated according to the engine rotational speed NE and the absolute intake pressure PBA, is adopted. Alternatively the basic fuel amount TIM may be calculated according to the intake air flow rate GA detected by an air flow rate sensor provided upstream of the throttle valve 3 in the intake pipe 2. In such an example, the fuel injection period TOUT is calculated by the following equation (1a) which does not contain the EGR correction coefficient KEGR, as in equation (1) described above.

$$TOUT = TIM \times KCMD \times KAF \times K1 + K2 \quad (1a)$$

In this example, if the intake air flow rate decreases by performing the exhaust gas recirculation, the reduction in the intake air flow rate is indicated in the intake air flow rate GA detected by the intake air flow rate sensor. Accordingly, the basic fuel amount TIM, which is set according to the intake air flow rate GA so that the air-fuel ratio may become substantially equal to the stoichiometric ratio, takes a value indicating the reduction in fresh air by the exhaust gas recirculation. Therefore, the equation (1a) which does not contain the EGR correction coefficient KEGR is used.

In this modification, when the valve lift amount LACT of the EGR valve 22 is changed, the basic fuel amount TIM changes according to the change in the exhaust gas recirculation amount. If the exhaust gas recirculation device is normal, the air-fuel ratio correction coefficient KAF always takes a value in the vicinity of "1.0" (FIG. 2A).

On the other hand, if a leak is present in the exhaust gas recirculation device, the mixture of the exhaust gases and the fresh air flows into the intake pipe 2 when the valve lift amount LACT of the EGR valve 22 is increased. Consequently, an amount of reduction in the basic fuel amount TIM set according to the intake air flow rate GA becomes excessively great. As a result, the air-fuel ratio deviates to the lean side, and the air-fuel ratio correction coefficient KAF increases so as to correct the deviation. Therefore, as shown in FIG. 2B, the air-fuel ratio correction coefficient KAF changes in the almost same cycle as the cycle of change in the valve lift amount LACT.

Further, in the above embodiment, the filtered correction coefficient KAFFIL80A which is calculated by performing the low pass filtering and the high pass filtering (i.e., the band pass filtering) of the air-fuel ratio correction coefficient KAF, is used as a parameter indicative of the changing component of the air-fuel ratio control amount. Alternatively, a deviation DAF of the air-fuel ratio coefficient from an average value KAFAVE may be used as the parameter indicative of the changing component of the air-fuel ratio control amount. The average value KAFAVE is obtained by averaging the air-fuel ratio correction coefficient KAF in one cycle of the opening and closing control of the EGR valve 22. Further, a filtered value obtained by filtering (low pass filtering or band pass filtering) the deviation DAF may be used as the parameter indicative of the changing component of the air-fuel ratio control amount.

Furthermore, the present invention can be applied also to a control system of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine provided with an exhaust gas recirculation device including an exhaust gas recirculation passage for recirculating exhaust gases from the engine to an intake system of the engine, and an exhaust gas recirculation control valve provided in said exhaust gas recirculation passage, for controlling the flow rate of the exhaust gases, said control system comprising:
   an air-fuel ratio sensor provided in the exhaust system of the engine;
   air-fuel ratio control means for implementing feedback control of the air-fuel ratio of an air-fuel mixture supplied to the engine based on the output of said air-fuel ratio sensor; and
   failure determining means for determining a failure of said exhaust gas recirculation device based on a changing component of the air-fuel ratio control amount calculated by the air-fuel ratio control means when changing the opening of said exhaust gas recirculation control valve in a predetermined cycle.

2. A control system according to claim 1, wherein said failure determining means determines that a leak is present in said exhaust gas recirculation device when an accumulated value of the changing component exceeds a determination threshold value.

3. A control system according to claim 2, wherein said failure determining means includes execution condition determining means for determining an execution condition of the failure determination according to an operating condition of said engine, holds the accumulated value when the execution condition is unsatisfied, and starts the accumulating calculation using the held accumulated value as an initial value when the execution condition has been satisfied.

4. A control system according to claim 1, wherein said failure determining means includes filtering means for filtering a pass band of the air-fuel ratio control amount to calculate a filtered air-fuel ratio control amount, and wherein said changing component is the filtered air-fuel ratio control amount.

5. A control system according to claim 1, further including EGR correction means for correcting the amount of fuel supplied to the engine in a decreasing direction as the opening of said exhaust gas recirculation control valve increases.

6. A control method for an internal combustion engine provided with an exhaust gas recirculation device including an exhaust gas recirculation passage for recirculating exhaust gases from the engine to an intake system of the engine, and an exhaust gas recirculation control valve provided in said exhaust gas recirculation passage, for controlling the flow rate of the exhaust gases, said control method comprising the steps of:
 a) detecting the air-fuel ratio of an air-fuel mixture supplied to the engine;
 b) implementing feedback control of the air-fuel ratio by calculating an air-fuel ratio control amount based on the detected air-fuel ratio; and
 c) determining a failure of said exhaust gas recirculation device based on a changing component of the air-fuel ratio control amount when changing an opening of said exhaust gas recirculation control valve in a predetermined cycle.

7. A control method according to claim 6, wherein a leak is determined to be present in said exhaust gas recirculation device when the accumulated value of the changing component exceeds a determination threshold value.

8. A control method according to claim 7, wherein determining the failure of the exhaust gas recirculation device includes the steps of:
 i) determining an execution condition of the failure determination according to an operating condition of the engine;
 ii) holding the accumulated value when the execution condition is unsatisfied; and
 iii) starting the accumulating calculation using the held accumulated value as an initial value when the execution condition has been satisfied.

9. A control method according to claim 6, further including the step of performing band pass filtering of the air-fuel ratio control amount, to calculate a filtered air-fuel ratio control amount, and said changing component is the filtered air-fuel ratio control amount.

10. A control method according to claim 6, further including the step of correcting an amount of fuel supplied to the engine in a decreasing direction as the opening of said exhaust gas recirculation control valve increases.

11. A computer program embodied on a computer-readable medium, for causing a computer to implement a control method for an internal combustion engine having an exhaust gas recirculation device which includes an exhaust gas recirculation passage for recirculating exhaust gases from the engine to an intake system of the engine, and an exhaust gas recirculation control valve provided in said exhaust gas recirculation passage, for controlling the flow rate of the exhaust gases, said control method comprising the steps of:
 a) detecting the air-fuel ratio of an air-fuel mixture supplied to the engine;
 b) implementing a feedback control of the air-fuel ratio by calculating an air-fuel ratio control amount based on the detected air-fuel ratio; and
 c) determining a failure of said exhaust gas recirculation device based on a changing component of the air-fuel ratio control amount when changing an opening of said exhaust gas recirculation control valve in a predetermined cycle.

12. A computer program according to claim 11, wherein a leak is determined to be present in said exhaust gas recirculation device when the accumulated value of the changing component exceeds a determination threshold value.

13. A computer program according to claim 12, wherein said step of determining the failure of said exhaust gas recirculation device includes the steps of:
 i) determining an execution condition of the failure determination according to an operating condition of the engine;
 ii) holding the accumulated value when the execution condition is unsatisfied; and
 iii) starting the accumulating calculation using the held accumulated value as an initial value when the execution condition has been satisfied.

14. A computer program according to claim 11, wherein said control method further includes the step of performing band pass filtering of the air-fuel ratio control amount to calculate a filtered air-fuel ratio control amount, and said changing component is the filtered air-fuel ratio control amount.

15. A computer program according to claim 11, wherein said control method further includes the step of correcting the amount of fuel supplied to the engine in a decreasing direction as the opening of said exhaust gas recirculation control valve increases.

* * * * *